United States Patent
Gerat et al.

(10) Patent No.: US 9,296,114 B2
(45) Date of Patent: Mar. 29, 2016

(54) ARTICULATED STRUCTURE OF A MULTIPLE-AXIS ROBOT AND ROBOT COMPRISING SUCH A STRUCTURE

(71) Applicant: STAUBLI FAVERGES, Faverges (FR)

(72) Inventors: Vincent Gerat, Saint Jorioz (FR); Joel Conrad, Doussard (FR); Eric Sallet, Frontenex (FR)

(73) Assignee: STAUBLI FAVERGES, Faverges (FR)

( * ) Notice: Subject to any disclaimer, the term of this patent is extended or adjusted under 35 U.S.C. 154(b) by 434 days.

(21) Appl. No.: 13/782,201

(22) Filed: Mar. 1, 2013

(65) Prior Publication Data

US 2013/0228031 A1    Sep. 5, 2013

(30) Foreign Application Priority Data

Mar. 2, 2012    (FR) ...................................... 12 51958

(51) Int. Cl.
| | | |
|---|---|---|
| *B25J 18/00* | (2006.01) | |
| *B25J 9/04* | (2006.01) | |
| *B25J 19/06* | (2006.01) | |

(52) U.S. Cl.
CPC *B25J 18/00* (2013.01); *B25J 9/044* (2013.01); *B25J 19/06* (2013.01); *Y10S 901/21* (2013.01); *Y10S 901/41* (2013.01); *Y10T 74/18624* (2015.01); *Y10T 74/20317* (2015.01)

(58) Field of Classification Search
CPC ............ B25J 9/044; B25J 18/00; B25J 19/06; Y10T 74/20317; Y10T 74/20329; Y10T 74/20335; Y10T 74/18624

USPC .................. 74/490.03, 490.05, 490.06, 89.29
See application file for complete search history.

(56) References Cited

U.S. PATENT DOCUMENTS 8,001,868 B2 *   8/2011   Palau et al. ................. 74/490.05
2008/0148895 A1   6/2008   Palau et al.

FOREIGN PATENT DOCUMENTS

| CN | 101066590 | 11/2007 |
|---|---|---|
| CN | 101194848 | 6/2008 |
| CN | 201239862 | 5/2009 |
| CN | 102275168 | 12/2011 |
| EP | 1852225 A1 | 11/2007 |
| JP | 1146678 A | 6/1989 |
| JP | 5116093 A | 5/1993 |
| JP | 8011378 B | 2/1996 |
| JP | 2006337052 | 12/2006 |
| JP | 2007237316 A | 9/2007 |
| WO | 2010027701 | 3/2010 |

* cited by examiner

*Primary Examiner* — William C Joyce
(74) *Attorney, Agent, or Firm* — Dowell & Dowell, PC (57) ABSTRACT

The articulated multiple-axis robot structure has a frame, an arm and a forearm, a shaft for attaching a tool, an actuator commanding the pivoting of a slide-socket, an actuator commanding the pivoting, a rotatable nut-socket, and a coupling device for securing the sockets in rotation. The coupling device having a coupling washer between the sockets and connected in rotation with one of the slide-socket and the nut-socket. The coupling washer is movable between a coupling configuration, in which the translation of the shaft relative to the forearm is locked, and an operating configuration, in which the translation and rotation of the shaft relative to the forearm are freed by a first electromagnet.

11 Claims, 5 Drawing Sheets

ARTICULATED STRUCTURE OF A MULTIPLE-AXIS ROBOT AND ROBOT COMPRISING SUCH A STRUCTURE

BACKGROUND OF THE INVENTION

1. Field of the Invention

The present invention relates to an articulated structure of a multiple-axis robot, as well as a multiple-axis robot comprising such a structure.

Multiple-axis robots are used to manipulate pieces quickly, along trajectories close to a plane. This is for example the case of picking up a piece moving on a conveyor belt and placing it on a flat packaging member.

2. Brief Description of the Related Art

Robots of the SCARA (Selective Compliance Assembly Robot Arm) type are multiple-axis robots suitable for working on a horizontal plane. Traditionally, a SCARA robot comprises a fixed frame, which may for example be placed on a table. An arm is also provided that is movable relative to the frame, at least in rotation, in particular around a vertical axis. Lastly, this robot is equipped with a member, such as a flange, that makes it possible to receive a tool, which is for example a gripping claw or a grinding tool. The member receiving the tool is mounted on a forearm, which in turn is rotatably mounted relative to the arm. Furthermore, the member for receiving the tool is rotatable relative to that forearm.

These robots should, however, also be able to move in a vertical plane. This vertical movement is generally performed by a linear bearing system, for example described in FR-A-2628170. The member for receiving the tool is then mounted on a shaft whereof the outer surface includes helical grooves and longitudinal grooves. Two sockets are mounted on the grooved shaft by means of balls housed in the grooves of the shaft, the inner surface of the first socket or "nut-socket" being provided with helical grooves and the second socket or "slide-socket" being provided with longitudinal grooves. The sockets are rotated separately and allow the grooved shaft, and therefore also the member receiving the tool, to move axially, to rotate, or to perform a combined rotational and translational movement.

In the event electricity to the robot is lost, the tool, or more generally the load of the robot, is driven downward by gravity in a combined translational and rotational movement, which is not in compliance with security requirements, since the robot and the load of the robot risk being damaged or injuring an operator.

To ensure vertical immobilization of the load in the event power is lost, it is known to equip the motors that drive the sockets with brakes which, when electricity is lost, immobilize the output shaft of the motors. These brakes are generally heavy, which is detrimental to the inertia of the moving parts of the robot, when the motors are fixed to those moving parts. The solution is therefore unfavorable for applications where the robot performs movements at a high speed.

Alternatively, EP-A-1852225 proposes securing the two sockets in rotation to brake the grooved shaft. The two sockets are arranged in the frame of the robot. To brake the grooved shaft, an electromagnet and a slitted ring slidingly mounted on the grooved shaft are provided below the two sockets, in the lower portion of the grooved shaft. The slitted ring is engaged, on either side and laterally, in a two-part bearing formed by two rings, one of which is stationary and the other of which is movable. The stationary ring is secured to the lower socket, while the moving ring is provided to be pushed by a spring against the stationary ring, such that the slitted ring is stuck between the two rings of the bearing. In the operating configuration of the robot, in which it is not necessary to brake the grooved shaft, the electromagnet attracts the moving ring toward it, against the return force exerted by the spring, thereby freeing the slitted ring, which does not immobilize the sockets. In the braking configuration, the electromagnet is no longer powered and the spring pushes the moving ring of the bearing back against the stationary ring, which jams the slitted ring and immobilizes the sockets to brake the load. In the operating configuration, the slitted ring rubs on the grooved shaft. The slitted ring thus has an undesirable positioning indetermination and wear risks, which is not desirable, in particular for operation at a very fast pace.

BRIEF SUMMARY OF THE INVENTION

The invention more particularly aims to resolve these drawbacks by proposing a multiple-axis robot structure incorporating a coupling system suitable for operating at a very fast pace.

To that end, the invention relates to an articulated structure for a multiple-axis robot, comprising:
  a stationary frame,
  an arm articulated on the frame around a first axis,
  a first electric actuator commanding pivoting of the arm around the first axis,
  a forearm articulated on the arm around a second axis parallel to the first axis,
  a second electric actuator commanding the pivoting of the forearm around the second axis,
  a shaft for fastening a tool, articulated on the forearm around a third axis parallel to the first and second axes,
  a third electric actuator commanding the pivoting of a slide-socket,
  a fourth electric actuator commanding the pivoting of a nut-socket.

According to the invention,
  the slide-socket is rotatable relative to the forearm around the third axis and connected in translation relative to the forearm, said slide-socket being provided with engaging members, in particular balls, arranged axially, which are capable of cooperating with at least one longitudinal groove of the shaft,
  the nut-socket is rotatable relative to the forearm around the third axis and connected in translation relative to the forearm, said nut-socket being provided with engaging members, in particular balls, arranged helically around the movement axis, which are capable of cooperating with at least one helical groove arranged on the shaft,
  the articulated structure also comprises a coupling device, capable of securing the nut-socket and the slide-socket in rotation, and
  the slide-socket and the nut-socket are arranged at the end of the forearm.

As explained in more detail hereafter, owing in particular to the coupling device, the robot according to the invention is particularly well suited for learning operations consisting of manually bringing the member receiving the tool to a desired location, then storing that configuration, rather than programming it. The sockets being arranged at the end of the forearm, they are dimensioned to actuate the shaft and the working load only. Their inertia is therefore low and does not penalize the dynamic performance. Only the shaft, the tool and the working load can move in a vertical direction. The volume swept by the arm and the forearm does not depend on the vertical position of the tool.

According to advantageous but optional aspects of the invention, such a robot structure may incorporate one or more of the following features, considered in any technically allowable combination:

The coupling device comprises a washer arranged axially, along the third axis, between the sockets and rotatably connected with a first socket from among the slide-socket and the nut-socket. The coupling washer is axially movable between:
- a coupling configuration, in which the coupling washer is kept against a second socket from among the slide-socket and the nut-socket, due to the adhesion between the coupling washer and the second socket,
- an operating configuration, in which the translation and rotation of the shaft relative to the forearm, along the movement axis, are freed by means of a first electromagnet which, when supplied with electricity, attracts the coupling washer toward the first socket, freeing the rotation of the first socket relative to the second socket.

When the electromagnet is supplied with electricity, it attracts the coupling washer toward it, thereby creating a free space between the washer and the second socket, such that the second socket is free to rotate relative to the nut-socket, thereby allowing operation of the robot. This configuration can be activated when the robot is powered on.

Advantageously, the coupling device then also comprises at least one elastic member. In the coupling configuration, the coupling washer is kept against the second socket by means of the elastic member, which is arranged axially between the first socket and the coupling washer and which pushes the coupling washer against the second socket and in the operating configuration, the electromagnet attracts the coupling washer toward the first socket, against the return force exerted by the elastic member.

When the electromagnet is no longer powered, the elastic member pushes the washer back against the second socket, such that the two sockets are secured in rotation due to the frictional adhesion between the washer and the first socket. This coupling configuration guarantees the vertical immobilization of the load supported by the tool bearing member. In this way, the safety of the robot is guaranteed, in particular at very fast paces, when the robot is used to handle pieces quickly.

Alternatively, the coupling device also comprises a second electromagnet. In the coupling configuration, the coupling washer is kept against the second socket by means of the second electromagnet, which, supplied with electricity, attracts the coupling washer against the second socket and in the operating configuration, the second electromagnet is not powered and the first electromagnet, supplied with electricity, attracts the coupling washer toward the first socket.

The electromagnet is mounted around a cap fixed on the first socket, with radial play between the cap and the electromagnet.

The rotational securing of the coupling washer with the first socket is done using at least one guide slug mounted in holes formed both in the coupling washer and the first socket.

The first electric actuator and the second electric actuator are stationary relative to the frame.

The third electric actuator is fixed on the arm and the fourth electric actuator is fixed on the forearm. Alternatively, the fourth electric actuator is fixed on the arm and the third electric actuator is fixed on the forearm.

The pivoting movement of at least one of the electric actuators is transmitted by means of a pulley and belt system.

The first socket is formed by the nut-socket and in that the second socket is formed by the slide-socket.

The invention also relates to a multiple-axis robot comprising such a robot structure.

BRIEF DESCRIPTION OF THE DRAWINGS

The invention will be better understood, and other advantages thereof will appear more clearly, in light of the following description of a multiple-axis robot according to the invention, provided solely as an example and done in reference to the appended drawings, in which.

DETAILED DESCRIPTION OF THE INVENTION

Figures 1, 2:
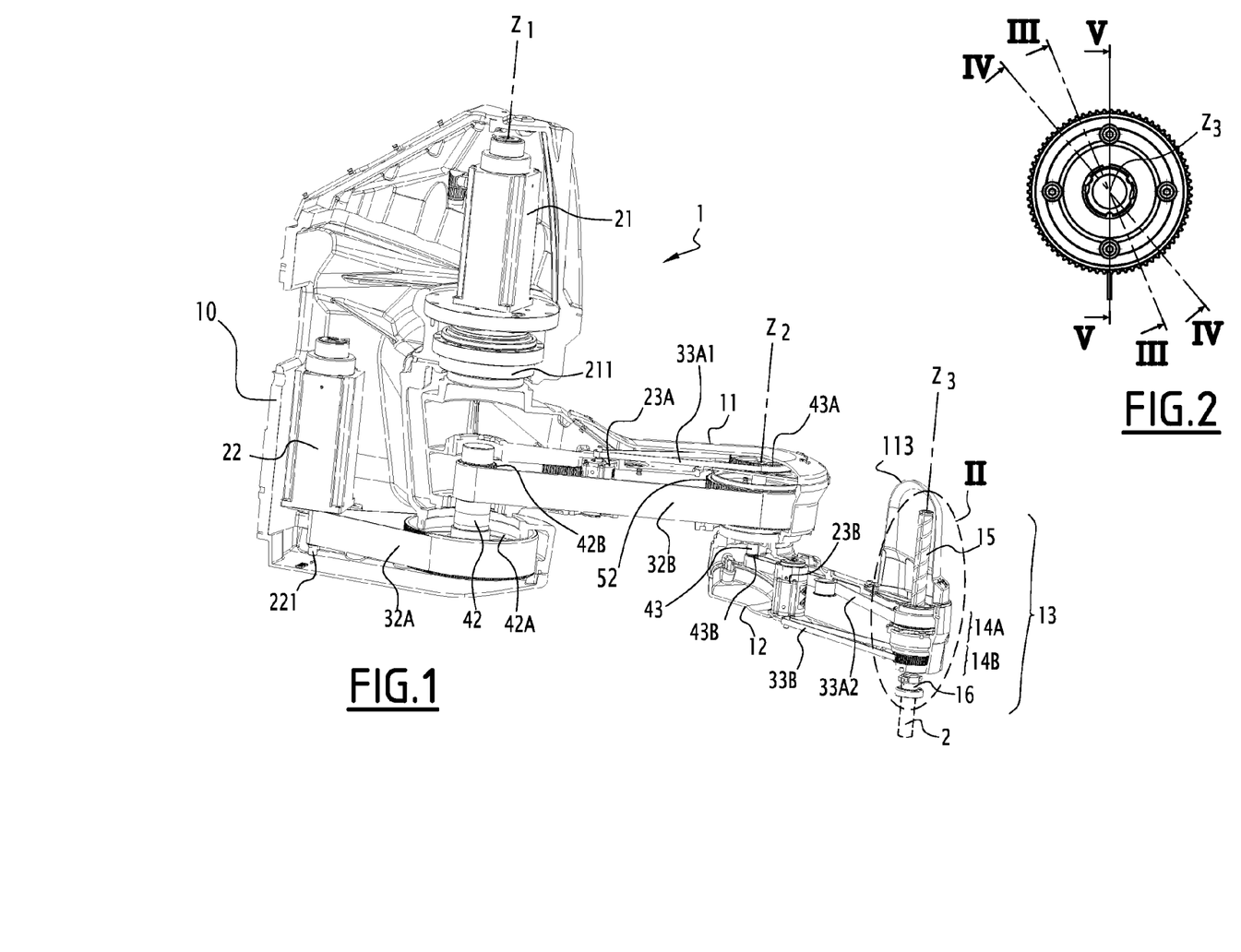
FIG. 1 is a cutaway perspective view of a multiple-axis robot according to the invention.
FIG. 2 is a partial top view of detail II in FIG. 1 without a cover.

The structure 1 shown in FIG. 1 is part of a multiple-axis SCARA robot that also comprises an electronic control unit, bundles of cables, and other accessories that are not shown for clarity of the figures.

The structure 1 is designed to move a tool 2, shown diagrammatically and in mixed lines only in FIG. 1, toward various positions along trajectories extending both in a horizontal plane and perpendicular to that plane. The tool 2 may for example be a gripping tool or a cutter.

The structure 1 comprises a frame 10 that is stationary relative to the location where the structure 1 is installed. The frame 10 forms a yoke for articulating arm 11 around a first vertical axis $Z_1$.

A first actuator 21, formed by an electric rotary gear reducer, the output shaft 211 of which is aligned on the axis $Z_1$ and secured in rotation with the arm 11, is mounted on the frame 10. The actuator 21 thus drives the arm 11 around the axis $Z_1$, relative to the frame 10.

The arm 11 supports a forearm 12 that is articulated relative to the arm 11 around a second axis $Z_2$ parallel to the axis $Z_1$, and therefore also vertical in the illustrated example. A second actuator 22, formed by a rotary electric motor whereof the output shaft 221 is provided with a pinion, is mounted in the frame 10. A synchronous belt 32A is mounted between said pinion and a toothed crown 42A fixed to a shaft 42, mounted in the frame 10, aligned on the axis $Z_1$ and freely rotating relative to the frame 10. Out of a concern for clarity in FIG. 1, the articulation bearings of the shaft 42 in the frame 10 and the arm 11 are not shown. The actuators 21 and 22 being placed in the frame 10, they are stationary and contribute to reducing the inertia of the arm 11 and the forearm 12, as they do not affect their mass, which favors the performance of the robot for applications requiring very quick movements.

Another synchronous belt 32B extends along the arm 11. This belt 32B is mounted between a pinion 42B fixed on the shaft 42 and a toothed crown 52 aligned on the axis $Z_2$ and secured in rotation with the forearm 12. The actuator 22 thus drives the forearm 12 around the axis $Z_2$, relative to the arm 11.

The forearm 12 bears, at its end opposite the arm 11, a tool bearing member 13 comprising two sockets 14A and 14B mounted around a shaft 15 that is hollow for the optional passage of power cables intended for the tool and aligned on a third movement axis $Z_3$ parallel to the axes $Z_1$ and $Z_2$ and therefore also vertical in the illustrated example. The socket 14B is mounted below the socket 14A and the sockets 14A and 14B are separated from each other by a distance d strictly greater than zero. The lower end of the shaft 15 is provided with a flange 16 for fixing the tool 2.

The socket 14A is rotated by an actuator 23A, mounted on the arm 11 and formed by an electric rotary actuator whereof the output shaft is provided with a pinion. The actuator 23A is placed relatively close to the axis $Z_1$ so as to reduce the inertia of the arm 11 owing to a double use system making it possible to reduce the inertia of the forearm 12 by fixing the actuator 23A on the arm 11. A synchronous belt 33A1 is mounted between said pinion and a toothed crown 43A mounted on a shaft 43 aligned on the axis $Z_2$ and freely rotating relative to the arm 11 and the forearm 12. Out of a concern for clarity in FIG. 1, the articulation bearings of the shaft 43 in the arm 11 and the forearm 12 are not shown. The shaft 43 is also equipped with a pinion 43B that meshes with a synchronous belt 33A2 mounted between said pinion 43B and the socket 14A. The actuator 23A thus drives the socket 14A around the axis $Z_3$, relative to the forearm 12.

The socket 14B is rotated by an actuator 23B, mounted on the forearm 12 and formed by an electric rotary actuator whereof the output shaft is provided with a pinion. The actuator 23B is placed relatively close to the axis $Z_2$ so as to reduce the inertia of the forearm 12. A synchronous belt 33B is mounted between said pinion and the socket 14B. The actuator 23B thereby drives the socket 14B around the axis $Z_3$, relative to the forearm 12.

The sockets 14A and 14B are rotated separately, relative to the forearm 12, using the actuators 23A and 23B.

To reduce their inertia, the arm 11 and the forearm 12 are made from a light metal alloy such as an aluminum or magnesium alloy, or from a composite material incorporating glass or carbon fibers. It will be noted that the transmission system of the structure 1 using pulleys and belts is lighter than a gear transmission system, which contributes to reducing the mass and therefore the inertia of the arm 11 and the forearm 12.

In FIG. 2, a protective cover 113 for the tool bearing member 13 is not shown.

Figure 5:
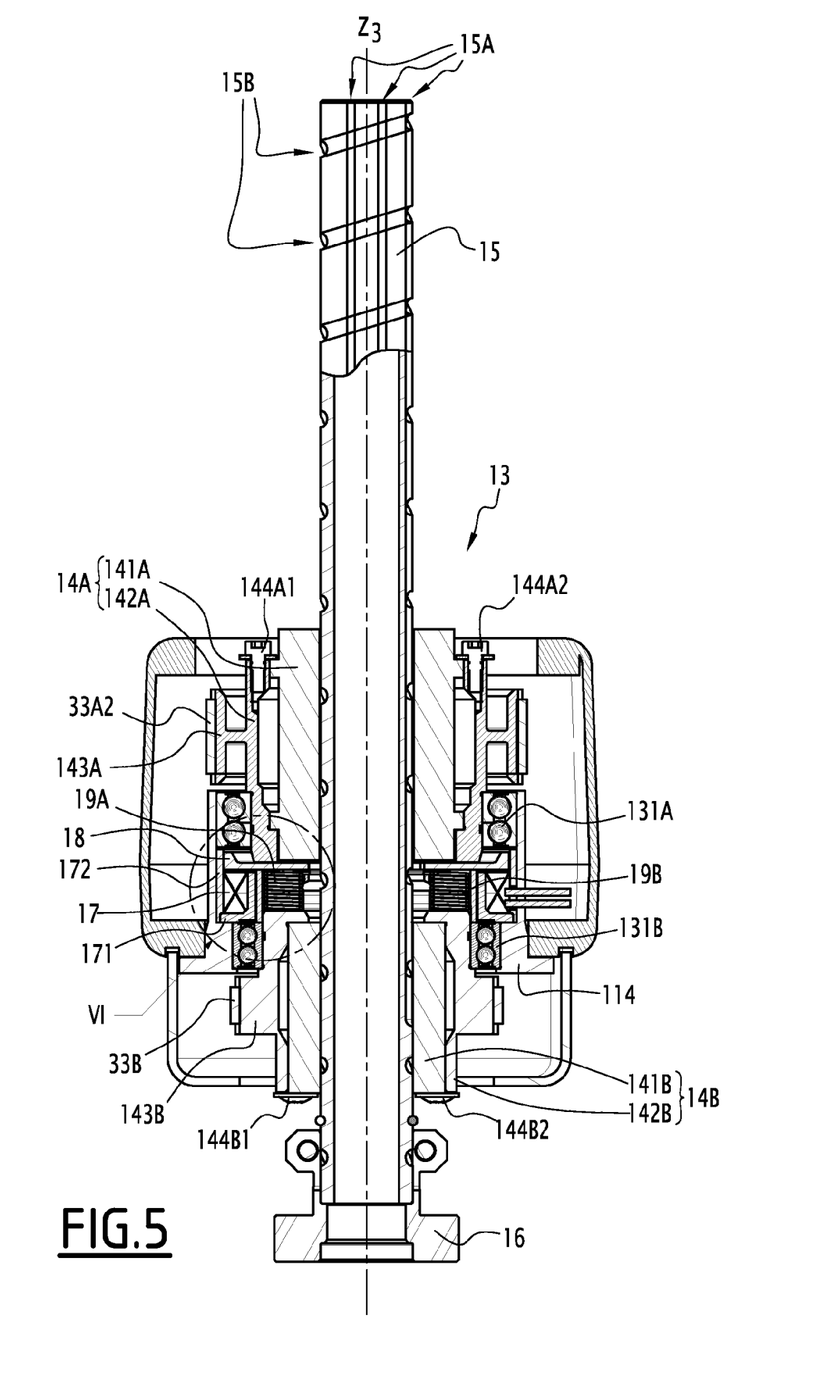

As more particularly shown in FIG. 5, the shaft 15 includes, in the outer peripheral surface thereof, a helical groove 15B for the circulation of engaging members, in particular balls, as well as longitudinal grooves 15A for the circulation of balls, forming ribs. In the figures, the balls are not shown. The grooves 15A and 15B overlap at their intersections.

The socket 14A comprises an inner sleeve 141A whereof the inner surface includes longitudinal grooves. The sleeve 141A is mounted in a belt support 142A supporting a toothed crown 143A that meshes with the belt 33A2. The inner sleeve 141A and the belt support 142A are fixed to each other using screws 144A1 and 144A2 and together form the socket 14A, which is mounted on the shaft 15 by means of balls that are arranged in the longitudinal grooves of the sleeve 141A and circulate in the longitudinal grooves 15A of the shaft 15.

The socket 14A, called the slide-socket, is thus rotatably connected relative to the shaft 15, along the axis $Z_3$, while being translatable relative to the shaft 15, along the axis $Z_3$.

Likewise, the socket 14B comprises an inner sleeve 141B whereof the inner surface includes a helical groove. The sleeve 141B is mounted inside a belt support 142B supporting a toothed crown 143B that meshes with the belt 33B. The inner sleeve 141B and the belt support 142B are fixed to each other using screws 144B1 and 144B2 and together form the socket 14B, which is mounted on the shaft 15 by means of balls that are arranged in the helical groove of the sleeve 141B and that circulate in the helical groove 15B of the shaft 15.

The socket 14B, called a nut-socket, is connected to the shaft 15 in a combined rotational and translational movement, along the axis $Z_3$.

Each socket 14A and 14B is rotatably mounted around the axis $Z_3$ in a body 114 of the tool bearing member 13, by means of support bearings 131A and 131B of the ball bearing type. The body 114 is stationary relative to the forearm 12. The sockets 14A and 14B can thus rotate independently of each other, around the axis $Z_3$, relative to the body 114. The sockets 14A and 14B are each locked in translation, along the axis $Z_3$, relative to the body 114.

Depending on the actuation or locking of each actuator 23A and 23B, each socket 14A and 14B is chosen to be rotated or kept immobile relative to the body 114 of the tool bearing member 13, which allows the shaft 15 to move axially or perform a combined movement comprising a rotational movement component around the axis $Z_3$ and a translational movement component along the axis $Z_3$.

More specifically, if one wishes to impart a pure translational movement to the shaft 15, only the actuator 23B of the nut-socket 14B is actuated, so as to rotate the nut-socket 14B, the other actuator 23A being locked in position. The rotational movement of said nut-socket 14B, which it will be recalled is locked in translation along the axis $Z_3$, then causes the translation of the shaft 15 along that axis $Z_3$. Furthermore, if one wishes to impart a pure rotational movement to the shaft 15, the two sockets 14A and 14B will be driven in the same direction of rotation, at the same speed of rotation.

Lastly, if one wishes to impart a combined translational and rotational movement to the shaft 15, one will actuate only the actuator 23A of the slide-socket 14A or drive both sockets 15A and 15B at different speeds of rotation. From this perspective, it is also possible to drive the actuators 23A and 23B in opposite directions of rotation, depending on the nature of the movement one wishes to impart to the shaft 15.

In the event power is cut, the output shafts of the actuators 23A and 23B are free to rotate and the tool 2, or more generally the load supported by the flange 16, is driven downward by gravity. The shaft 15 then tends to descend in a combined translational and rotational movement, which is bad for operator safety and protection of the equipment. To prevent this phenomenon, the tool bearing member 13 comprises a device for locking the downward translation of the shaft 15, in the event of a power loss to the robot, in particular in the event the power supply for the actuators 23A and 23B is cut.

This device is made up of an electromagnet 17 that is stationary relative to the body 114 of the tool bearing member 13 and placed, along the axis $Z_3$, between the sockets 14A and 14B. The electromagnet 17 is mounted in a flanged ring 171 having a longitudinal end that bears against a surface of the body 114 oriented perpendicular to the axis $Z_3$. The electromagnet 17 and the flanged ring 171 are arranged in an outer ring 172 mounted inside the body 114. The electromagnet 17, the flanged ring 171 and the outer ring 172 are coaxial and centered on the axis $Z_3$.

Figure 4:
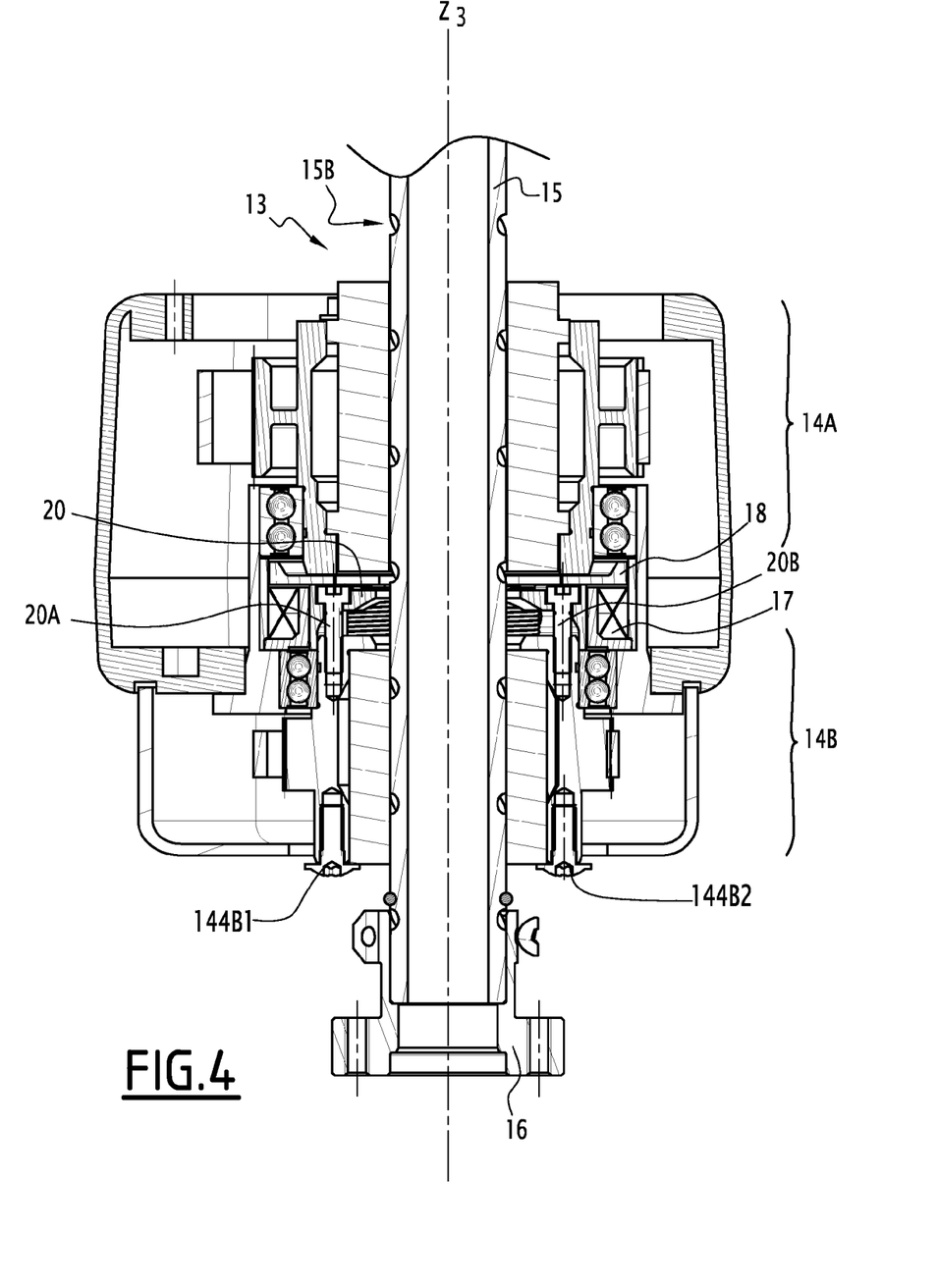

As shown in particular in FIG. 4, a globally annular cap 20, centered on the axis $Z_3$, is fixed around the upper end of the nut-socket 14B, using two screws 20A and 20B. The cap 20 includes a central passage for the shaft 15 and is arranged in the inner cylindrical volume of the flanged ring 171.

Figure 6:
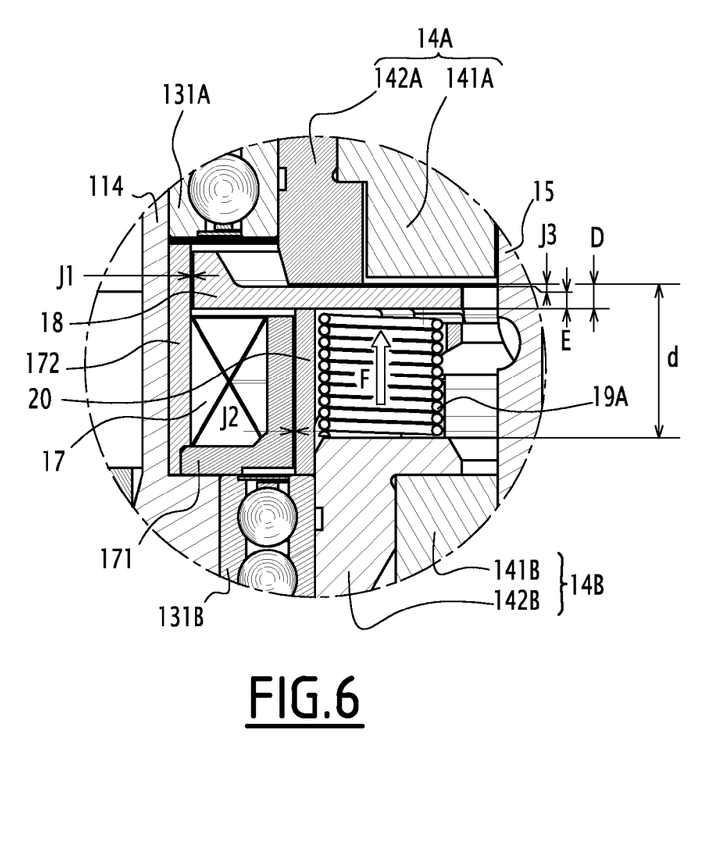
FIG. 6 is a larger scale view of detail VI in FIG. 5.

A coupling washer 18, arranged in the inner cylindrical volume of the outer ring 172 and freely translatable along the axis $Z_3$ relative to the body 114, is mounted around the shaft 15, between the sockets 14A and 14B and above the electromagnet 17. As shown in FIG. 6, slight radial play J1 and J2 is present between the outer circumferential surface of the coupling washer 18 and the inner circumferential surface of the outer ring 172 on the one hand, and between the outer circumferential surface of the cap 20 and the inner circumferential surface of the flanged ring 171 on the other hand, so as to prevent friction during the relative rotational movement of those elements.

The coupling washer 18 is arranged, along the axis $Z_3$, between the cap 20 and the slide-socket 14A. D denotes a minimum distance measured along the axis $Z_3$, between the cap 20 and the slide-socket 14A. E denotes the thickness of the coupling washer 18, measured parallel to the axis $Z_3$, at the part of the coupling washer 18 situated at the minimum distance D. The distance D is slightly larger than the thickness E, such that the coupling washer 18 is capable of translating, along the axis $Z_3$, between the cap 20 and the slide-socket 14A.

Elastic members 19A and 19B of the compression spring type are axially arranged between, and in contact with, the belt support 142B of the nut-socket 14B and the coupling washer 18. The cap 20 is pierced to allow the passage of the springs 19A and 19B. The return force F exerted by the springs 19A and 19B on the coupling washer 18 tends to push the coupling washer 18 back upward, against the belt support 142A of the slide-socket 14A, opposite the nut-socket 14B.

Figure 3:
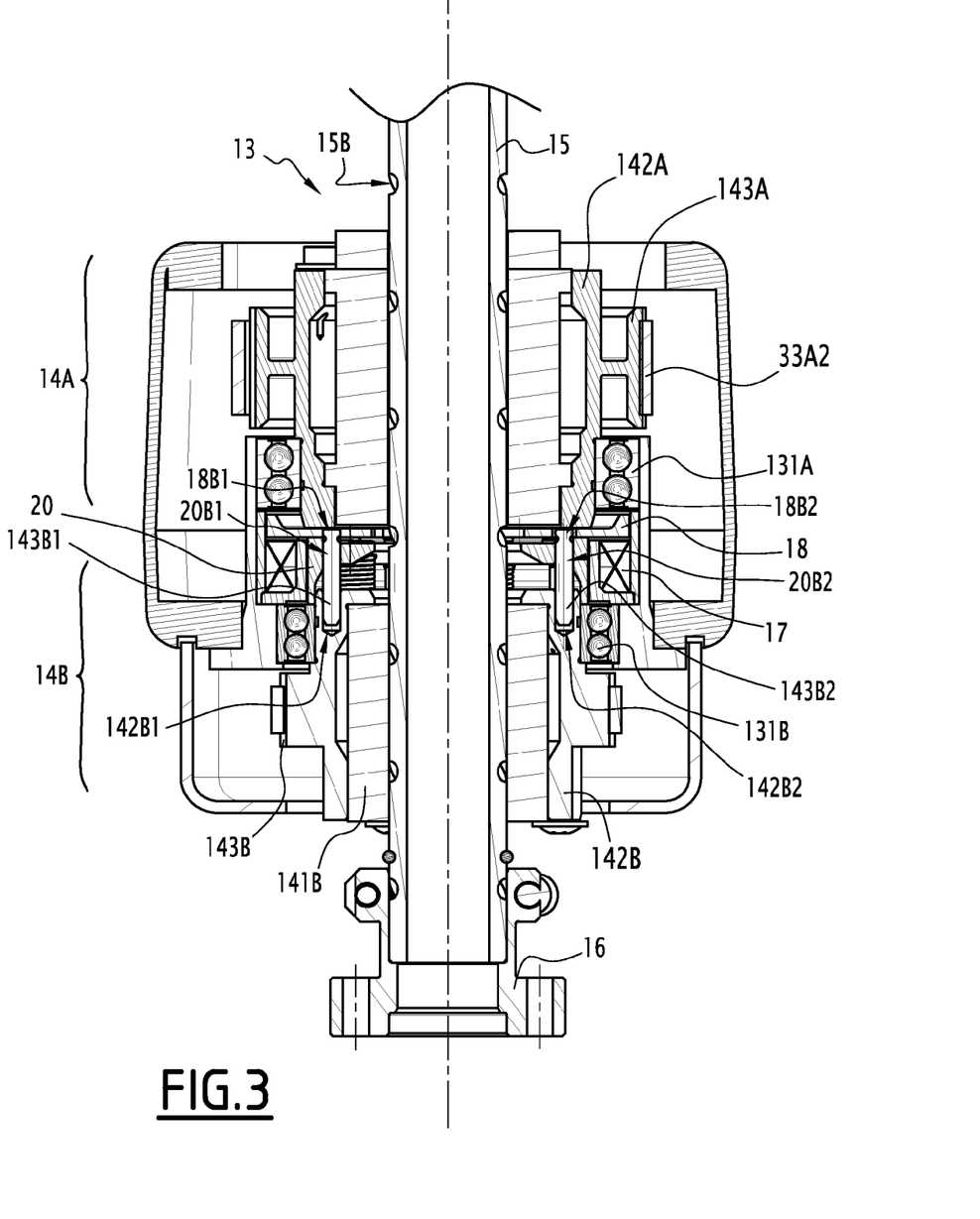
FIGS. 3, 4 and 5 are cross-sections, respectively along lines III-III, IV-IV and V-V of FIG. 2.

As shown in FIG. 3, guide slugs 143B1 and 143B2 parallel to the axis $Z_3$ are firmly mounted each in a hole 142B1 or 142B2 made in the belt support 142B, and each sliding in a hole 18B1, 20B1 or 18B2, 20B2 made in the cap 20 and in the coupling washer 18. The guide slugs 143B1 and 143B2 secure the coupling washer 18 in rotation with the nut-socket 14B and the cap 20, while allowing the translation of the coupling washer 18 relative to the nut-socket 14B and the cap 20.

The nut-socket 14B, the guide slugs 143B1 and 143B2, the cap 20 and the coupling washer 18 are therefore integral with each other and can rotate together freely and without friction relative to the body 114, around the axis $Z_3$, in particular owing to the bearing 131B and the radial play J1 and J2.

The coupling washer 18, the cap 20, the outer ring 172 and the flanged ring 171 are made from a magnetic material, for example soft iron, so as to be able to react to the magnetic field created by the electromagnet 17.

The operation is as follows: in the operating configuration of the robot, shown in FIG. 6, the coil of the electromagnet 17 is supplied with electricity. In particular, the flow lines of the magnetic field created by the electromagnet 17 circulate in a circuit successively formed by the coil of the electromagnet 17, the flanged ring 171, the play J2, the cap 20, the coupling washer 18, the play J1, the outer ring 172 and the coil of the electromagnet 17.

The coupling washer 18 is then attracted toward the electromagnet 17 and the nut-socket 14B, owing to the magnetic field created by the electromagnet, and thus bears against the cap 20. In this way, functional play J3 measured along the axis $Z_3$ is present between the coupling washer 18 and the slide-socket 14A. The sockets 14A and 14B are therefore not mechanically connected to each other, which allows them to rotate independently of each other, as a function of the command from the actuators 23A and 23B. This operating configuration of the robot is actuated by default during use, so as to leave the movement of the shaft 15 free. It corresponds to a state of the robot in which it is capable of performing a cycle of programmed movements or responding to isolated movement commands, for example issued from a control terminal.

Figure 7:
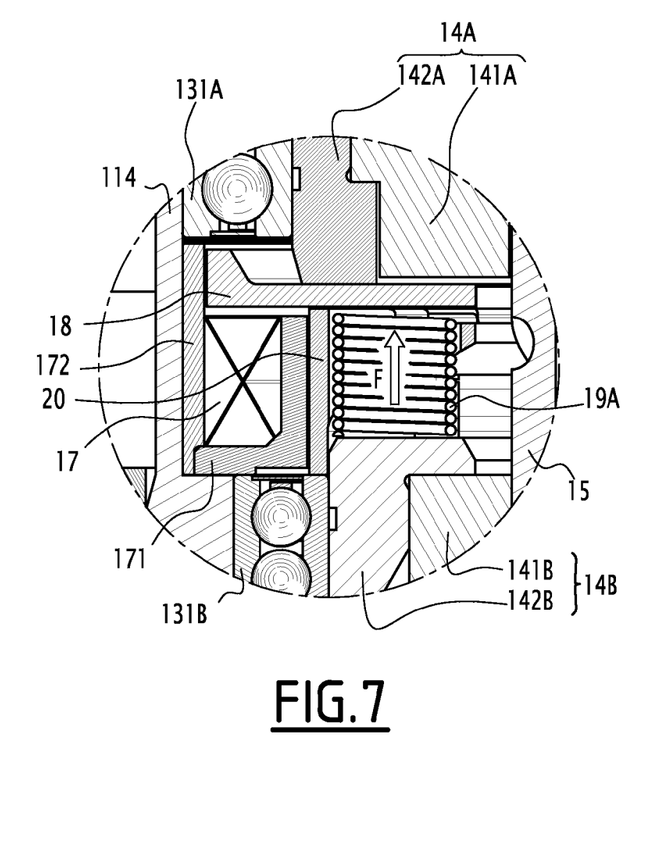
FIG. 7 is a view similar to FIG. 6, for another usage configuration.

In a coupling configuration, shown in FIG. 7, the coil of the electromagnet 17 is no longer supplied with electricity and the springs 19A and 19B push the coupling washer 18 back upward, in contact with the slide-socket 14A. Owing to the frictional adhesion between the slide-socket 14A and the assembly formed by the coupling washer 18, the cap 20 and the nut-socket 14B, the sockets 14A and 14B are then connected to each other in rotation and translation. The shaft 15 can no longer translate relative to the sockets 14A and 14B, along the axis $Z_3$, due to the assembly of the shaft 15 with the sockets 14A and 14B, by means of balls circulating in the grooves 15A and 15B.

Thus, in the coupling configuration, the mass of the tool 2, and more generally the load fixed to the shaft 15, cannot be driven downward by gravity, which secures the robot and the load.

Given that in the coupling configuration, the rotation of the sockets 14A and 14B relative to the body 114 of the tool bearing member 113 is free, it is possible to perform learning operations for the robot structure 1, since the arm 11, the forearm 12 and the assembly formed by the sockets 14A and 14B and the shaft 15 can each be rotated, around the axes $Z_1$, $Z_2$ and $Z_3$. Furthermore, the fact that the shaft 15 is locked in translation is advantageous, in particular inasmuch as it is not necessary for the operator to support it against gravitational pull.

The electromagnet 17 has a single effect, inasmuch as the coupling position is activated automatically when electricity is lost, which is advantageous for safety purposes. The robot structure 1 quickly stops the vertical movement of the shaft 15 in the event power is lost, since the reaction time of the electromagnet 17 is very short and the movement of the coupling washer 18 is very fast, given the small value of the play J3.

The actuators 23A and 23B do not need to be equipped with brakes, since the coupling washer 18 ensures coupling of the shaft 15. The coupling washer 18 is the only movable piece dedicated to coupling, which makes it possible to consider having an electromagnet with small dimensions. The weight breakdown is then favorable relative to the known alternative solution consisting of equipping the actuators 23A and 23B with brakes. Owing to the invention, the inertia of the arm, the forearm 12 and the tool bearing member 13 is reduced.

Alternatively, the nut-socket 14B is situated above the slide-socket 14A. The coupling washer 18 may be connected in translation to the slide-socket 14A instead of being assembled to the nut-socket 14B.

In the illustrated example, when the electromagnet 17 is no longer powered, the coupling washer 18 comes into contact with the belt support 142A of the slide socket 14A, but alternatively, the coupling washer 18 may come into contact with the inner sleeve 141B. By reversing the coupling system, this contact may also occur at the nut-socket 14B.

The described example implements a single-affect electromagnet that acts against a return force exerted by an elastic member. Alternatively, the maintenance of the coupling washer 18 may result from the effect of an additional electromagnet placed symmetrically to the electromagnet 17, whereof it copies the construction. In that case, in the coupling configuration, the coupling washer 18 is kept against the slide-socket 14A using the additional electromagnet, which, supplied with electricity, attracts the coupling washer 18 against the slide-socket 14A. In the operating configuration, the additional electromagnet is not powered and the first electromagnet 17, supplied with electricity, attracts the coupling washer 18 toward the nut-socket 14B so as to keep the coupling washer 18 away from the slide socket 14A.

Alternatively, the guide balls of the sockets 14A and 14B are replaced by other engagement members, in particular rolls or rollers.

In the context of the invention, the features of the various alternatives may be combined with each other, at least in part.

The invention claimed is:

1. An articulated structure for a multiple-axis robot, comprising:
   a stationary frame,
   an arm articulated on the frame around a first axis,
   a first electric actuator commanding pivoting of the arm around the first axis,
   a forearm articulated on the arm around a second axis parallel to the first axis,
   a second electric actuator commanding the pivoting of the forearm around the second axis,
   a shaft for fastening a tool, articulated on the forearm around a third axis parallel to the first and second axes,
   a third electric actuator commanding the pivoting of a slide-socket,
   a fourth electric actuator commanding the pivoting of a nut-socket,
   wherein
      the slide-socket is rotatable relative to the forearm around the third axis and connected in translation relative to the forearm, said slide-socket being provided with engaging members arranged axially, which are capable of cooperating with at least one longitudinal groove of the shaft,
      the nut-socket is rotatable relative to the forearm around the third axis and connected in translation relative to the forearm, said nut-socket being provided with engaging members arranged helically around a movement axis, which are capable of cooperating with at least one helical groove arranged on the shaft,
      the slide-socket and the nut-socket are arranged at the end of the forearm, and
      the articulated structure also comprises a coupling device, capable of securing the nut-socket and the slide-socket in rotation, wherein
         the coupling device comprises a coupling washer arranged axially, along the third axis, between the nut-socket and slide socket and rotatably connected with a first socket from one of the slide-socket and the nut-socket and wherein the coupling washer is axially movable between
            a coupling configuration, in which the coupling washer is kept against a second socket from another of the slide-socket and the nut-socket, due to adhesion between the coupling washer and the second socket, and
            an operating configuration, in which the translation and rotation of the shaft relative to the forearm, along the movement axis, are freed by means of a first electromagnet which, when supplied with electricity, attracts the coupling washer toward the first socket.

2. The articulated structure according to claim 1, wherein the coupling device then also comprises at least one elastic member,
   in that in the coupling configuration, the coupling washer is kept against the second socket using the elastic member, which is arranged axially between the first socket and the coupling washer and which pushes the coupling washer back against the second socket, and
   in that in the operating configuration, the electromagnet attracts the coupling washer toward the first socket, against the return force exerted by the elastic member.

3. The articulated structure according to claim 1, wherein the coupling device also comprises a second electromagnet,
   in that in the coupling configuration, the coupling washer is kept against the second socket by means of the second electromagnet, which, supplied with electricity, attracts the coupling washer against the second socket, and
   in that in the operating configuration, the second electromagnet is not powered and the first electromagnet, supplied with electricity, attracts the coupling washer toward the first socket.

4. The articulated structure according to claim 1, wherein the electromagnet is mounted around a cap fixed on the first socket, with radial play between the cap and the electromagnet.

5. The articulated structure according to claim 1, wherein the rotational securing of the coupling washer with the first socket is done using at least one guide slug mounted in holes formed both in the coupling washer and the first socket.

6. The articulated structure according to claim 1, wherein the first electric actuator and the second electric actuator are stationary relative to the frame.

7. The articulated structure according to claim 1, wherein the third electric actuator is fixed on the arm and wherein the fourth electric actuator is fixed on the forearm.

8. The articulated structure according to claim 1, wherein the fourth electric actuator is fixed on the arm and wherein the third electric actuator is fixed on the forearm.

9. The articulated structure according to claim 1, wherein the pivoting movement of at least one of the electric actuators is transmitted by means of a pulley and belt system.

10. The articulated structure according to claim 1, wherein the first socket is formed by the nut-socket and wherein the second socket is formed by the slide-socket.

11. The articulated structure according to claim 1, wherein the engaging members of the slide-socket and the engaging members of the nut-socket are balls.

* * * * *